L. Moss
Hydrant
Nº 18,595.    Patented Nov. 10, 1857.
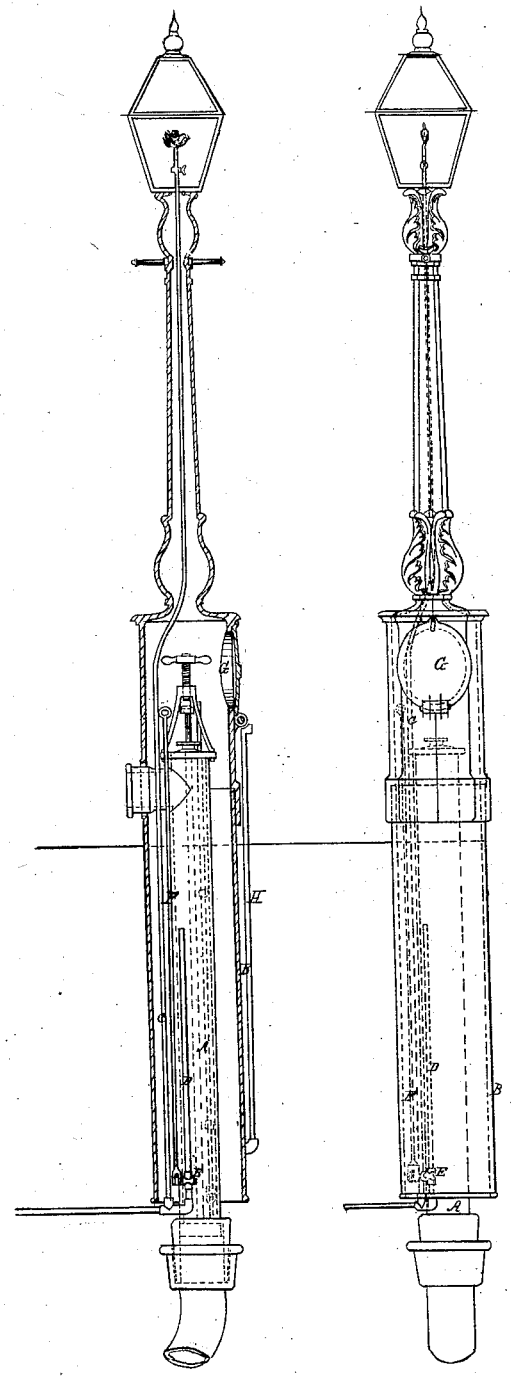
Inventor:
L. Moss.

UNITED STATES PATENT OFFICE.

LUCIEN MOSS, OF PHILADELPHIA, PENNSYLVANIA.

FIRE-PLUG.

Specification of Letters Patent No. 18,595, dated November 10, 1857.

*To all whom it may concern:*

Be it known that I, LUCIEN MOSS, of Philadelphia, in the county of Philadelphia, State of Pennsylvania, have invented a new and improved method of arranging and constructing fire-plugs with the design of preventing the water therein from freezing and for thawing it if accidentally it at any time becomes frozen; and I do hereby declare that the following is a full and exact description thereof, reference being had to the accompanying drawings and the letters of reference marked thereon.

The nature of my invention consists in the introduction within the metallic or other non-combustible casing surrounding the water pipe or plug proper, of a pipe conveying gas, the said gas pipe being so arranged with openings or burners, that the gas may be ignited, and the flame, and heat caused thereby, made to act upon the water pipe or plug proper, the upper portion of the metallic casing surrounding the water pipe or plug proper may be so arranged that it may serve the purpose of a lamp post, which arrangement I claim as being a convenient modification of my invention.

In order to prevent the water in the plug from becoming frozen during times of extreme cold, the gas conveyed by means of the aforesaid gas pipe, within the metallic or other non-combustible casing surrounding the plug proper should be kept burning thus producing a temperature about the water pipe, that will prevent the water in said pipe from freezing. Or if from neglect or accident the water in the plug proper should become frozen, the gas should be ignited and the heat thus produced within the metallic or other non-combustible casing, acting upon the water pipe will thaw the water within, the combustion being maintained by the introduction of air through the tube H or otherwise.

The following is a description of the accompanying drawings: A, water pipe or plug proper. B, metallic or other non-combustible casing. The upper portion of the accompanying drawings being designed as a lamp post. C, gas pipe for supplying the lamp post. D, gas pipe so arranged that the flame, and heat produced thereby, from the openings or burners may be made to act upon the water pipe, A, and within the metallic or other non-combustible casing, B. E, cock for regulating the flow of gas into the pipe D. F, lever for moving the cock E. G, hand hole in the casing B, for the purpose of facilitating the working of the valve in the water pipe, and the lever for moving the cock E. H, the air pipe.

What I claim as my invention, and desire to secure by Letters Patent, is—

The arrangement of fire plugs, so that a gas pipe may be introduced within the metallic or other non-combustible casing surrounding the water pipe or plug proper, said gas pipe being so arranged with openings or burners, that the flame and heat produced thereby, caused by the gas flowing from them being ignited, may be made to act upon the water pipe and cause the water therein to be thawed if it should by accident, or from neglect have become frozen; or to produce within the metallic or other non-combustible casing, a temperature, that will prevent the water in the plug proper from becoming frozen during times of extreme cold.

LUCIEN MOSS.

Witnesses:
HENRY J. TAYLOR,
SAMUEL L. TAYLOR.